United States Patent
Souza (10) Patent No.: US 8,874,757 B2
(45) Date of Patent: Oct. 28, 2014

(54) METHOD OF FACILITATING IP CONNECTIONS TO HOSTS BEHIND MIDDLEBOXES

(75) Inventor: Victor Souza, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 267 days.

(21) Appl. No.: 12/808,822

(22) PCT Filed: Dec. 19, 2007

(86) PCT No.: PCT/SE2007/051034
§ 371 (c)(1),
(2), (4) Date: Jun. 17, 2010

(87) PCT Pub. No.: WO2009/078772
PCT Pub. Date: Jun. 25, 2009

(65) Prior Publication Data
US 2011/0202644 A1    Aug. 18, 2011

(51) Int. Cl.
*G06F 15/16* (2006.01)
*H04L 29/12* (2006.01)
*H04L 29/08* (2006.01)

(52) U.S. Cl.
CPC ............ *H04L 67/24* (2013.01); *H04L 61/2557* (2013.01); *H04L 61/255* (2013.01); *H04L 61/2517* (2013.01); *H04L 61/256* (2013.01)
USPC .......................................... 709/227; 709/228

(58) Field of Classification Search
CPC ... H04L 61/2517; H04L 61/256; H04L 67/24; H04L 61/2557; H04L 61/255
USPC ................................................. 709/227, 228
See application file for complete search history.

(56) References Cited

U.S. PATENT DOCUMENTS

| 6,421,711 | B1 * | 7/2002 | Blumenau et al. ............ 709/213 |
| 7,633,948 | B2 * | 12/2009 | Yokomitsu et al. ...... 370/395.54 |
| 7,684,394 | B1 * | 3/2010 | Cutbill et al. ................. 370/389 |
| 2002/0024946 | A1 | 2/2002 | Jeong et al. |

(Continued)

FOREIGN PATENT DOCUMENTS

| CN | 1925439 A | 3/2007 |
| CN | 101030919 A | 5/2010 |
| WO | WO 0133353 A2 | 5/2001 |

OTHER PUBLICATIONS

Cheshire, et al.: "NAT Port Mapping Protocol (NAT-PMP)". draft-cheshire-nat-pmp-02.txt. Sep. 14, 2006.

(Continued)

*Primary Examiner* — Phuoc Nguyen (57) ABSTRACT

The present invention relates to a method and arrangement of facilitating the establishment of peer-to-peer IP connections between a public network and hosts in a private or home network. The method uses a port mapping table residing in a NAT that maps external public IP addresses and external port numbers to private IP addresses and internal port numbers. This table has so far been configured manually by a user of the private or home network. Apart from being cumbersome, it demands skills in router and network technology, skills an ordinary user of a home network often does not have. The present invention solves this problem by automatically configuring the table comprising the steps of scanning the hosts using a port scanner and detecting the internal ports in the hosts that are in an open state.

11 Claims, 4 Drawing Sheets

(56) References Cited

U.S. PATENT DOCUMENTS

| | | |
|---|---|---|
| 2003/0154306 A1* | 8/2003 | Perry .......................... 709/245 |
| 2003/0212779 A1 | 11/2003 | Boyter et al. |
| 2003/0233576 A1* | 12/2003 | Maufer et al. ............... 713/201 |
| 2005/0256958 A1* | 11/2005 | Wilson ......................... 709/227 |
| 2006/0215684 A1 | 9/2006 | Capone |
| 2007/0076729 A1 | 4/2007 | Takeda |
| 2007/0078986 A1* | 4/2007 | Ethier et al. ................. 709/227 |
| 2009/0006648 A1* | 1/2009 | Gopalakrishnan et al. ... 709/245 |
| 2009/0080420 A1 | 3/2009 | van de Poel et al. |
| 2010/0268763 A1* | 10/2010 | Rasanen ....................... 709/203 |

OTHER PUBLICATIONS

Lee, et al.: "An expanded NAT with 1-10 server connection ability". Sep. 1999.

* cited by examiner

METHOD OF FACILITATING IP CONNECTIONS TO HOSTS BEHIND MIDDLEBOXES

TECHNICAL FIELD OF THE INVENTION

The present invention relates to a method and an arrangement of facilitating the establishment of IP connections between a public network and terminals and servers in a private network behind a middlebox such as a Network Address Translator (NAT).

DESCRIPTION OF RELATED ART

The number of personal computers (PCs) and other terminals in each home that have access to the Internet is continuously increasing. All these terminals (forming a home/private network) are normally connected to a network access node (such as a wireless router). The network access node is in turn connected to the public network (the Internet) via a cable modem or an ADSL modem. Each terminal is allocated a private IP address that is unique within the home network. Normally, the Internet Service Provider (ISP) allocates only one public IP address per modem or network access node. So, in order to allow more than one terminal in the home network to communicate towards the internet using only one public IP address, a Network Address Translation module is necessary. This module could nave a Network Address Translation (NAT) functionality or a Network Address Port Translation (NAPT) functionality but the common term NAT is used further on in this document. The NAT functionality is described in the Internet specifications RFC 1631 and RFC 3022. Most network access nodes have a NAT implemented. The connection through the NAT (named a session) is normally identified by a 4-tuple of port forwarding parameters (a private IP address, a private port number, a remote IP address, a remote port number). A port number can for example be '80' which is used for web surfing using the HTTP protocol. By using these addresses and port numbers and by creating a port mapping table, the NAT ensures that outgoing packets from the terminal in the private network are routed to, for example, an external server having a public IP address in the public network. Likewise the NAT (also by using the port mapping table) ensures that incoming packets from the server are routed to the right terminal having a private IP address in the private network.

The most used type of NAT, namely outbound NAT, only allows the automatic creation of an entry in the pert mapping table when the first packet is sent from a host located in the private network towards a host in the public network.

Therefore, an outbound NAT works fine when connections are established from the terminals in the private network to the server having a public IP address (a typical client/server connection). However, in situations where the connections are to be established towards the terminals in the private network from other terminals in the public network or other private networks the above mechanism insufficient. One example of applications that need to have this type of connections is peer-to-peer (P2P) communication like teleconferencing, file sharing and online gaming. Another example is when a connection is to be established towards a home server in the private network. Applications that can be running in the home server include but are not limited to FTP, web server and file server. Methods to overcome this problem are known from prior art.

One method is called 'Relaying'. This method uses an intermediate server. As an example, a connection is established between a first terminal in a private network and the intermediate server. Another connection is established between a second terminal in another private network and the same server. As the server now has established connections with both the first and second terminals, the server can relay IP packets between these two terminals. A disadvantage with this method is that it requires additional resources in terms of server processing power and network bandwidth as all the packets have to pass through the server.

Another method is 'UDP hole punching'. UDP hole punching assumes that the first and second terminals already have an active connection with a so called rendezvous server. In this method the first terminal asks the rendezvous server for help to establish a connection to the second terminal. The rendezvous server has information about how to reach the second terminal and basically assists both terminals to establish a connection between each other. This connection is established directly between the two terminals, and no relaying of packets by the server is needed.

The two methods above are described more in detail in for example the paper 'Peer-to-Peer Communication across Network Address Translators' by Brian Ford et al presented at the USENIX Annual Technical Conference, April 2005.

A drawback with these two methods is that they require the application to be 'NAT aware'. This means that the application has to know that a NAT is present and that an intermediate or a rendezvous server is needed. If the application does not have support tor this it will not work.

Yet another known method is the manual configuration of port mapping or port forwarding tables. This method consists of manual configuration of a port mapping table residing in the NAT that maps an external public IP address belonging to the NAT and an external port number to a private IP address and an internal port number. The port forwarding table is typically configured manually by the end-user. When an incoming packet from, the public network arrives to the NAT, the NAT forwards the packet to the right port in the right terminal having the private IP address. In this way, terminals in the public network or in other private networks that want to establish a connection wish a terminal or server in the private network behind the NAT can do this in a totally transparent way.

SUMMARY OF THE INVENTION

The manual configuration of port mapping or port forwarding tables for NAT traversal brings several disadvantages. Apart from being cumbersome and error prone, it demands skills in router and network technology, skills an ordinary user of a home network often does not have.

These problems are solved by the current invention by introducing a method and a network access node designed to facilitate the establishment of IP (e.g., TCP/IP) connections from the public network towards the terminals or servers (here commonly called hosts) in the private network by automatically (using a port scanner) creating the port mapping table.

The method starts with the step of determining the private IP address to a first host in the private network. The next step is to send scanning messages (e.g., TCP SYN) to at least one internal port in the host. From the response messages received from each the at least one internal port, the network access node determines which internal ports are in an open state (in LISTEN state according to RFC793). For each open internal port, the network access node creates an external port having the same port number as the open internal port. For each host, the private IP address and the port numbers for the open internal port and the external port are stored in the port mapping table. As a last step each external port is set in an open state.

With these addresses and port numbers (together called port forwarding parameters) stored in the mapping table, incoming IP connections from the public network can now easily be forwarded to the correct application in the correct host.

The invention also comprises a network access node that comprises a Network Address Translation module (such as a NAT or a NAPT) and a port scanner that is designed to scan at least one internal port in the host. The port scanner is further designed to determine the port number of each internal port that is in an open state. For each open internal port one instance of an external port having the same port number as the open internal port is created by the network access node. The network access node is further designed to store in a port mapping table in the NAT a private IP address to the first host together with the port numbers of each open internal port in the host and each created external port.

An advantage with the current invention is also that a user of a private/home network having no technical skills in IP communication can automatically and simply configure the network access node to receive connection establishments from the public network to a host in the private network (e.g. for receiving an incoming VoIP call).

Other advantages are that the invention saves time and that human mistakes by the user are eliminated.

An objective with the current invention is therefore to facilitate in an automated way peer-to-peer communication towards hosts in a private network.

The invention will now be described in more detail and with preferred embodiments and referring to accompanying drawings.

DETAILED DESCRIPTION OF EMBODIMENTS

Figure 1:
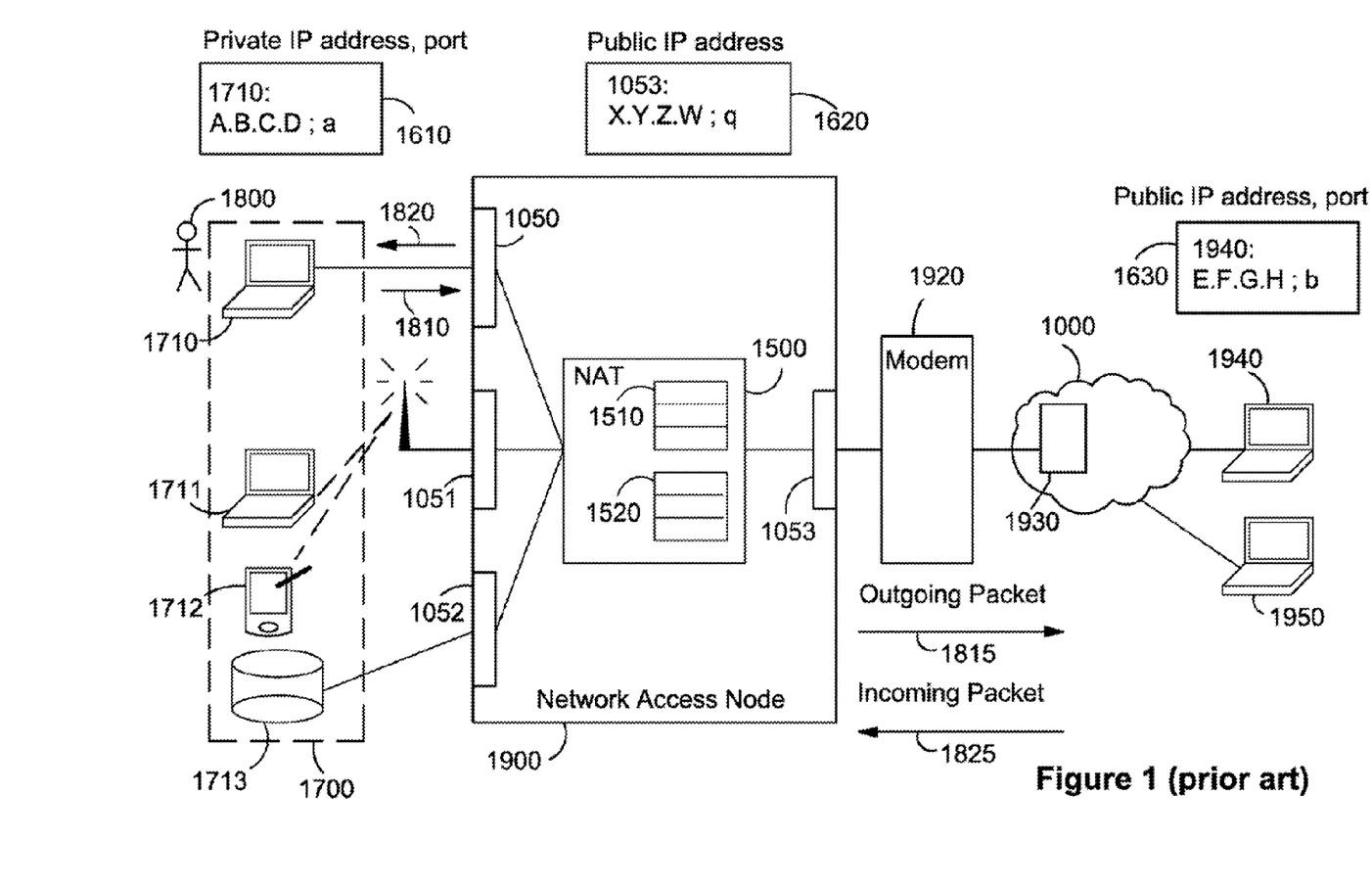
FIG. 1 is a block diagram showing a prior art network access node.

FIG. 1 is a block diagram showing an example of a known private network configuration involving a number of terminals 1710-1712 and a home server 1713 forming a private network (home network) 1700 connected to a network access node (such as a wireless router) 1900. The home server 1713 is among all designed to act as common data storage for the other terminals 1710-1712 in the home network 1700 but is also designed to be accessed from a public network 1000. The terminals 1710-1712 (here two laptops and one PDA) and the home server 1713 are here also commonly called hosts. Each host 1710-1713 is connected to the roister 1900 via a private network interface 1050-1052 respectively. The private network interfaces 1050 and 1052 are wired interfaces (using an Ethernet cable) whereas the interface 1051 is wireless (typically using any of the IEEE 802.11 WLAN protocols). The router 1900 is further connected to a node 1930 belonging to an ISP (Internet Service Provider). The router 1900 is connected to the node 1930 via a public network interface 1053 in the access node 1900 and a modem 1920, such as a cable modem or an ADSL modem. The modem 1920 is in some implementations integrated in the network access node 1900.

As mentioned above, it is normal that only one public IP address X.Y.Z.W 1620 per network interface 1053 is obtained from the ISP. So, when the user 1800 connects any of his/her terminals 1710-1712 towards a public terminal (or a server) 1940, 1950 connected to the public network (the Internet) 1000, a Network Address Translation (NAT) 1500 is needed.

Basically, the NAT 1500 inspects IP packets 1810 received from the terminals 1710-1712. When the terminal 1710 tries to access a public terminal 1940, the NAT 1500 will see from the IP packet 1810 that the private IP address A.B.C.D 1610 of terminal 1710 is establishing a connection to the public terminal 1940 having a public IP address E.F.G.H 1630. The originating (internal) port for the terminal 1710 is 'a' 1610 and the destination port for the public terminal 1940 is 'b' 1630. This (4-tuple) relation is stored by the NAT 1500 in a first mapping table 1510. Before the IP packet 1810 is sent towards the public terminal 1940 as outgoing package 1815, the originating address A.B.C.D 1610 is modified to the public IP address X.Y.Z.W 1620 of the network interface 1053. A port translation may be needed, and the outgoing port used is also recorded by the NAT.

Subsequent incoming packets 1825 coming from the public terminal 1940 at IP address E.F.G.H and port "b" are inspected by the NAT 1500 and as the NAT 1500 already has stored the 4-tuple relation between ports and IP addresses in the first mapping table 1510, it knows that the incoming packet 1825 should be forwarded as packet 1820 to terminal 1710 having the private IP address A.B.C.D and port 'a' 1610.

However, when trying to establish a connection from an arbitrary public terminal 1950 towards any of the terminals 1710-1712 or the home server 1713 in the private network 1700, the mechanism described above is insufficient. The NAT 1500 does not have a priori any relation stored between the arbitrary public terminal 1950 and any of the terminals 1710-1712 or the home server 1713. The packets from the public terminal 1950 are therefore dropped.

Whereas the port mappings in table 1510 are created automatically by the NAT 1500 at outgoing connection establishment, the mappings for incoming connection establishments have to be configured manually beforehand by the user 1800 of the private network 1700. These manually configured mappings are stored in a second mapping table 1520.

Figure 2:
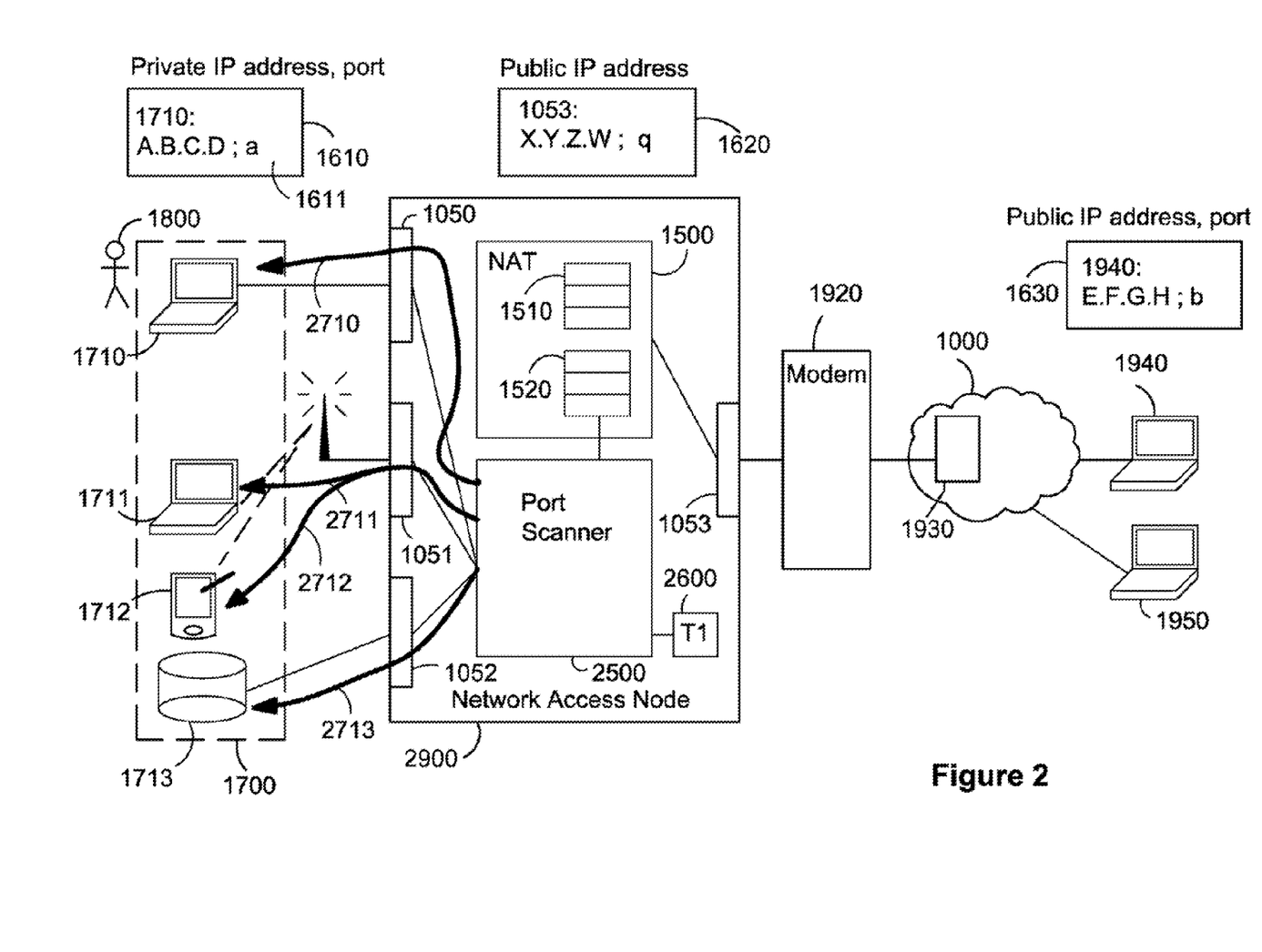
FIG. 2 is a block diagram showing an embodiment of the present invention implemented in a network access node.

The current invention automates the creation of this port mapping cable 1520. FIG. 2 is a block diagram showing an embodiment of the current invention, a network access nods 2900 similar to the access node 1900 in FIG. 1 but also comprising a port scanner 2500. This port scanner 2500 is designed to send scanning messages (e.g., TCP SYN messages) 2710-2713 towards all internal ports 1611 in each terminal 1710-1712 and home server 1713.

When an internal port 1611 in any of the hosts 1710-1713 receives the scanning message 2710-2713 it sends a response message (not shown in FIG. 2). From the response messages, the port scanner 2500 determines which ports are in an open state (in LISTEN state). The port number for each open internal port 1611 is stored in the port mapping table 1520 in the NAT 1500 together with the IP address of the host 1710-1713 from where the response message was sent. The private IP address 1610 of each host 1710-1713 is known beforehand by the network access node 2900. For each open internal port 1611, the network access node 2900 also creates an instance of an external port having the same port number as the open internal port 1611. The port number for this external port is also stored in the port mapping table 1520. Finally, each created external port is set in an open state (LISTEN state).

With these addresses and. port numbers stored in the mapping table 1520, incoming IP connections from terminals 1940, 1950 in the public network 1000 can now easily be forwarded to the correct internal port 1611 in the correct terminal.

Figure 3:
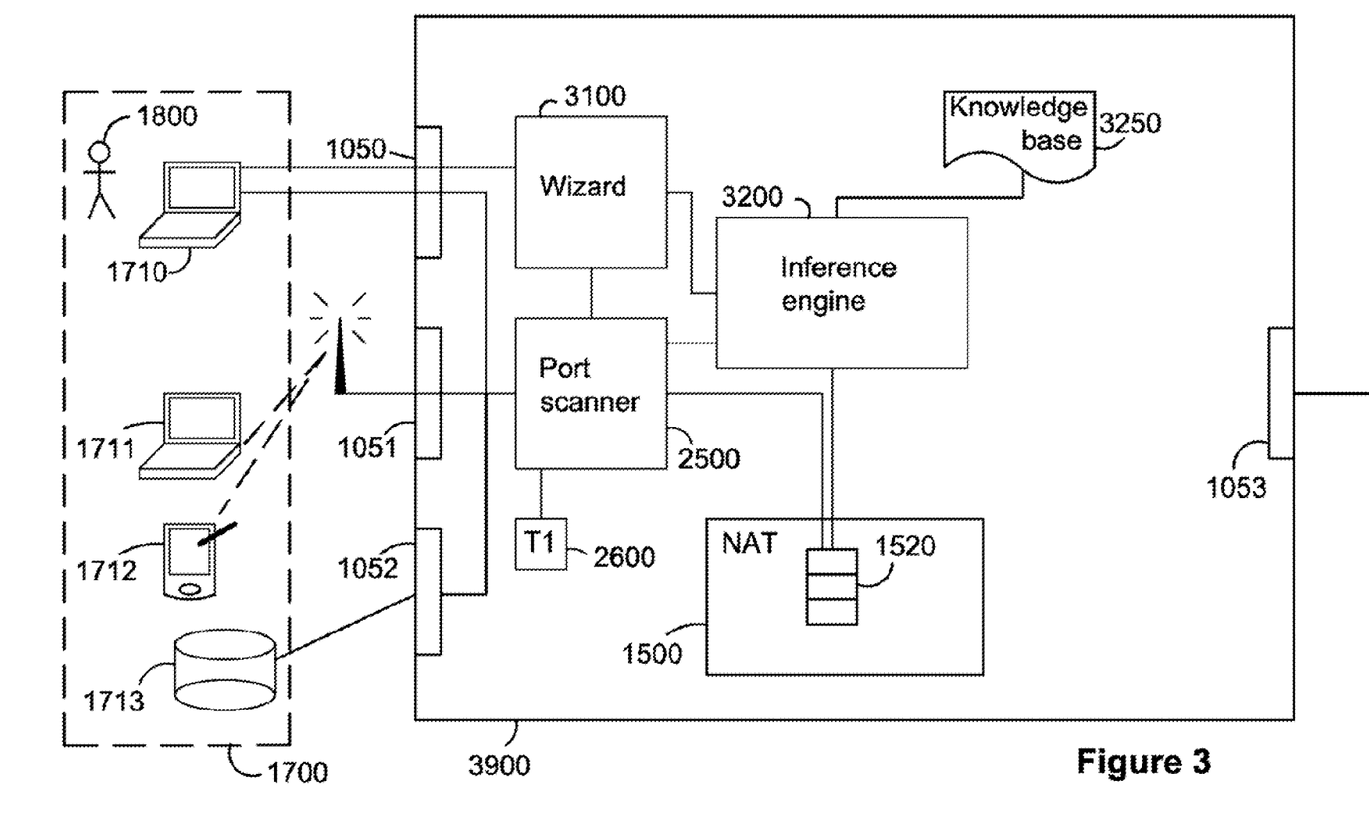
FIG. 3 is a block diagram showing a second embodiment of the present invention.

The port scanning can automatically be repeated at regular intervals by using a timer T1 2600 that triggers the pert scanner 2500, but the user 1800 can also initiate the scanning him/herself. The latter option is illustrated in FIG. 3 which is a second embodiment of the current invention. This embodiment, a network access node 3900, comprises all the features in the first embodiment illustrated in FIG. 2 but with the addition of an installation wizard 3100, a knowledge base 3250 and an inference engine 3200 connected to the wizard 3100 and the knowledge base 3250. The installation wizard 3100 is designed to guide the user 1800 to configure the network access node 3300 by asking the user 1800 a set of questions. The input given from the user 1800 and received by the wizard 3100 is forwarded to the inference engine 3200. The inference engine 3200 also retrieves stored information from the knowledge base 3250. The inference engine 3200 processes the input received from the user 1800 together with the stored information from the knowledge base 3250, and generates configuration data that is stored in at least one configuration memory area (comprising for example the port mapping table 1520). In this second embodiment, the port scanner 2500 is coupled to the wizard 3100. In a certain step in configuring the network access node 3900, the wizard 3100 triggers the port scanner 2500 which starts to send scanning messages towards the internal ports 1611 in the terminals 1710-1712 and the home server 1713. The port scanner 2500 determines the internal ports 1611 that are in an open state and the port numbers for the open ports are stored in the port mapping table 1520 in the NAT 1500.

Guided by the wizard 3100, the user 1800 can also prepare the hosts 1710-1713 by starting additional applications in the hosts 1710-1713 not yet started, applications that can be expected to be accessed from the public terminals 1940, 1950 in the public network 1000. These applications include but are not limited to FTP server, peer-to-peer videoconferencing, peer-to-peer file sharing, peer-to-peer gaming, web server. By starting the applications, the internal port 1611 for that application is put in an open state (LISTEN state). Again, after using the method in the current invention the port mapping 1520 is automatically configured and applications in the hosts 1710-1713 can now be accessed from the terminals 1940, 1950 in the public network 1000.

The second embodiment in FIG. 3 does not exclude the possibility to also have the port scanning started automatically and at regular intervals by using the timer T1 2600.

Figure 4:
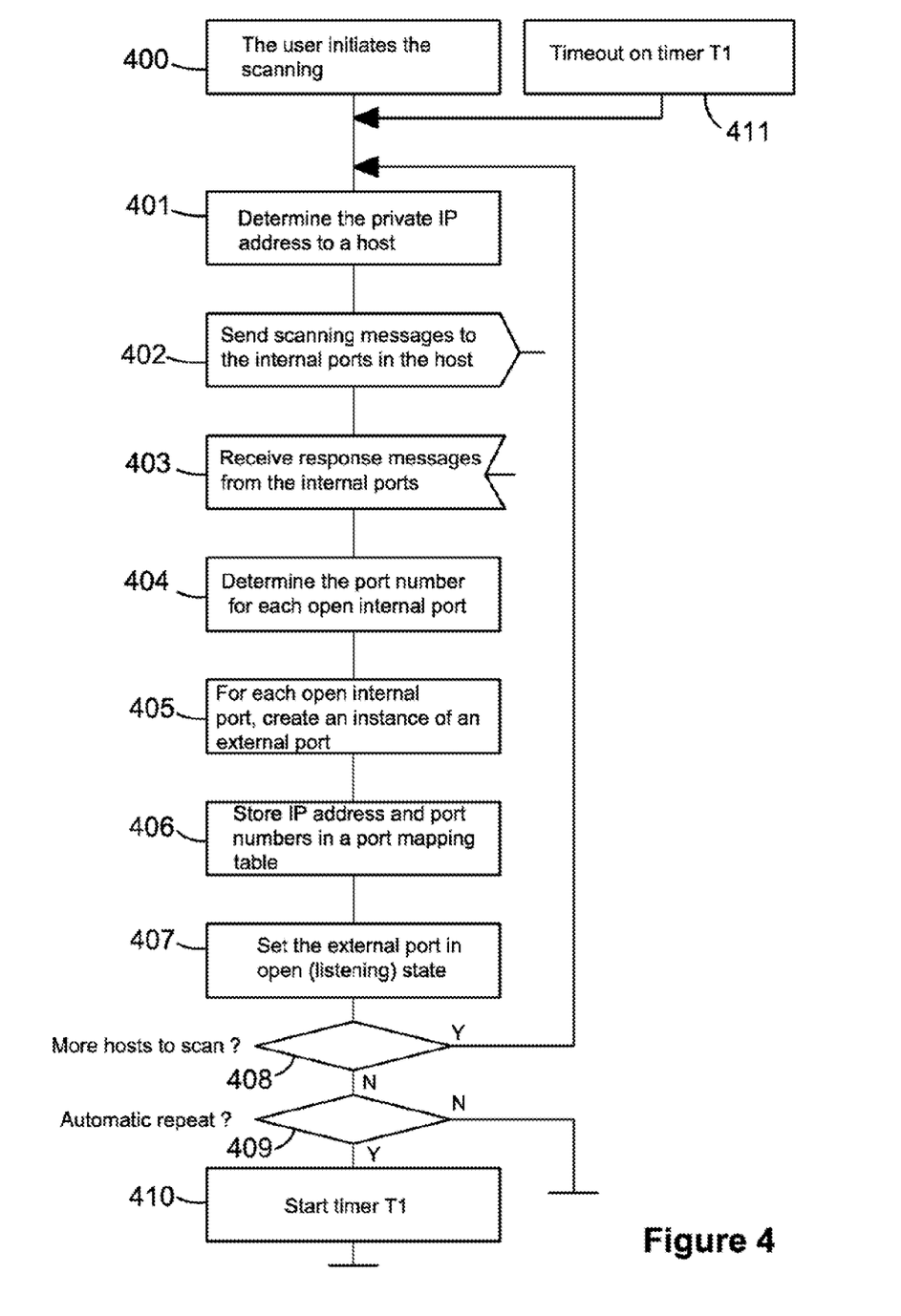
FIG. 4 is a flow chart illustrating the method according to the current invention.

FIG. 4 is a flow diagram illustrating the method to configure the port mapping table 1520 according to the current invention. If the user 1800 initiates the scanning this is done in step 400. In step 401, the private IP address to a first host 1710 is determined. The IP addresses to the hosts 1710-1713 in the private network 1700 are determined by looking in a memory area in the network access node 2900. In step 402, the port scanner 2500 sends scanning messages 2710 to the internal ports 1611 in the host 1710. Response messages from the internal ports 1611 are received in step 403. In step 404 the port number for open port is determined and for each internal port number 1611, an instance of an external port number is created in step 405. The port number of the external port is set to the same port number as the internal port 1611. The port numbers for the internal and the external port are in step 406 stored together with the private IP address of the host 1710 in the port mapping table 1520. Finally, to allow incoming connections, each external port is put in an open state in step 407.

The sequence 401-407 is repeated in step 406 for each host 1710-1713 in the private network 1700.

If the option to have the scanning process automatically repeated at regular intervals is selected, step 409, a timer T1 2600 is started in step 410. When this timer T1 2600 times out in step 411, the steps 401-407 are repeated again as described above.

Although the invention described above primarily addresses home networks it is obvious to a person skilled in the art that the invention equally can be used in other private networks such as enterprise networks etc. Besides, the port scanner can also be used to configure other network middleboxes, for example, home firewalls.

The invention claimed is:

1. A method of facilitating the establishment of IP connections from a public network towards hosts in a private network connected to a network access node said method comprising the steps of:
   determining the private IP address to a first host;
   sending a scanning message towards at least one internal port in the first host;
   receiving a response message from the at least one internal port;
   determining the port number of at least one internal port that is in an open state;
   for each internal port that is in an open state creating an instance of an external port having the same port number as the internal port;
   storing in a port mapping table the private IP address to the first host together with the port numbers of each open internal port and each external port;
   setting each external port in an open state.

2. The method as in claim 1 where the sequence of all steps is performed for all hosts connected to the network access node.

3. The method as in claim 2 where the method is performed by using a port scanner in the network access node.

4. The method as in claim 3 where the sequence of all steps is initiated by a user.

5. The method as in claim 3 where the sequence of all steps is automatically repeated at regular intervals.

6. The method as in claim 1 where each scanning message is a TCP SYN message.

7. A network access node connected to at least one host in a private network said node comprising:
   a Network Address Translation module comprising a port mapping table;
   a port scanner that is designed to scan at least one internal port in the host and to determine the port number of each internal port that is in open state;
   that it is designed to create for each open internal port an instance of an external port having the same port number as the open internal port and
   that it is further designed to store in the port mapping table a private IP address to the first host together with the port numbers of each open internal port and each external port, so that IP connections from the public network towards the host can be established.

8. The network access node as in claim 7 comprising a timer T1 designed to trigger the port scanner to start sending scanning messages at regular intervals.

9. The network access node as in claim 7 comprising an installation Wizard coupled to the port scanner and an inference machine coupled to the wizard where said wizard and inference machine are designed to assist the user to configure the network access node.

10. The network access node as in claim 9 where the wizard is designed to trigger the port scanner to start sending scanning messages.

11. The network access node as in claim 9, wherein said inference machine processes user input received from said wizard and generates configuration data that is stored in at least one configuration memory area of said network access node, wherein said configuration data comprises said port mapping table.

* * * * *

UNITED STATES PATENT AND TRADEMARK OFFICE
CERTIFICATE OF CORRECTION

PATENT NO.        : 8,874,757 B2
APPLICATION NO.   : 12/808822
DATED             : October 28, 2014
INVENTOR(S)       : Souza It is certified that error appears in the above-identified patent and that said Letters Patent is hereby corrected as shown below:

In the Specification

In Column 1, Line 28, delete "nave" and insert -- have --, therefor.

In Column 1, Line 48, delete "pert" and insert -- port --, therefor.

In Column 2, Line 28, delete "tor" and insert -- for --, therefor.

In Column 2, Line 36, delete "from," and insert -- from --, therefor.

In Column 2, Line 40, delete "wish" and insert -- with --, therefor.

In Column 3, Line 59, delete "roister" and insert -- router --, therefor.

In Column 4, Line 46, delete "cable" and insert -- table --, therefor.

In Column 4, Line 47, delete "nods" and insert -- node --, therefor.

In Column 5, Line 1, delete "and." and insert -- and --, therefor.

In Column 5, Line 7, delete "pert" and insert -- port --, therefor.

In Column 5, Line 17, delete "3300" and insert -- 3900 --, therefor.

In Column 6, Line 3, delete "406" and insert -- 408 --, therefor.

Signed and Sealed this
Second Day of June, 2015

Michelle K. Lee
*Director of the United States Patent and Trademark Office*